(12) United States Patent
Smith et al.

(10) Patent No.: US 10,348,668 B2
(45) Date of Patent: Jul. 9, 2019

(54) OVERLAY NETWORK OVER A MESSAGING NETWORK

(71) Applicant: Red Hat, Inc., Raleigh, NC (US)

(72) Inventors: Andrew John Smith, Sudbury, MA (US); Theodore Langston Ross, Littleton, MA (US)

(73) Assignee: Red Hat, Inc., Raleigh, NC (US)

( * ) Notice: Subject to any disclaimer, the term of this patent is extended or adjusted under 35 U.S.C. 154(b) by 1049 days.

(21) Appl. No.: 13/902,544

(22) Filed: May 24, 2013

(65) Prior Publication Data

US 2014/0351371 A1 Nov. 27, 2014

(51) Int. Cl.
*H04L 12/58* (2006.01)
*H04L 12/715* (2013.01)

(52) U.S. Cl.
CPC .............. *H04L 51/28* (2013.01); *H04L 45/64* (2013.01); *H04L 51/066* (2013.01)

(58) Field of Classification Search
CPC ......... H04L 12/46; H04L 45/64; H04L 51/28; H04L 51/066
USPC ........................................................ 709/217
See application file for complete search history.

(56) References Cited

U.S. PATENT DOCUMENTS

| | | |
|---|---|---|
| 7,463,648 B1 | 12/2008 | Eppstein et al. |
| 8,224,971 B1 | 7/2012 | Donnellan et al. |
| 8,346,935 B2 | 1/2013 | Mayo et al. |
| 2004/0202185 A1 * | 10/2004 | Ratcliff ............... H04L 12/4641 370/395.53 |
| 2004/0252721 A1 * | 12/2004 | Lingafelt ............ H04L 12/4633 370/473 |
| 2007/0171918 A1 * | 7/2007 | Ota ..................... H04L 12/2856 370/395.53 |
| 2008/0250492 A1 * | 10/2008 | Hazard ............... H04L 63/0272 726/15 |
| 2008/0285575 A1 * | 11/2008 | Biswas ................... H04L 41/04 370/401 |
| 2010/0115606 A1 | 5/2010 | Samovskiy et al. |
| 2010/0189103 A1 * | 7/2010 | Bachmann ............ H04W 28/06 370/389 |
| 2010/0306547 A1 * | 12/2010 | Fallows ................ G06F 21/305 713/178 |

(Continued)

FOREIGN PATENT DOCUMENTS

WO 2012125144 9/2012

*Primary Examiner* — Davoud A Zand
*Assistant Examiner* — Adam A Cooney
(74) *Attorney, Agent, or Firm* — Haynes and Boone, LLP

(57) ABSTRACT

A system and method for sending a message over a network are provided. An example system includes a first network interface that is assigned a first Internet Protocol (IP) address, where the network interface is linked to a logical network. The system also includes a messaging protocol module that obtains a first message to be sent over a messaging network to a target system linked to the logical network, generates a second message by encapsulating, based on a messaging protocol, the first message, and determines a destination address for the second message, where the destination address includes a text string and a second IP address of the target system. The system further includes a second network interface that sends over the messaging network the second message having the destination address, where the messaging network is based on the messaging protocol.

16 Claims, 6 Drawing Sheets

(56) References Cited

U.S. PATENT DOCUMENTS

| | | | |
|---|---|---|---|
| 2010/0316054 A1* | 12/2010 | Xu | H04L 12/4633 370/392 |
| 2011/0142045 A1* | 6/2011 | Ait-Ameur | H04L 12/4641 370/392 |
| 2011/0161525 A1* | 6/2011 | Tanimoto | H04L 12/4625 709/249 |
| 2012/0147890 A1* | 6/2012 | Kikuchi | H04L 12/4633 370/392 |
| 2012/0180044 A1 | 7/2012 | Donnellan et al. | |
| 2012/0250686 A1* | 10/2012 | Vincent | H04L 12/4633 370/392 |
| 2012/0281708 A1 | 11/2012 | Chauhan et al. | |
| 2012/0300615 A1* | 11/2012 | Kempf | H04W 24/02 370/216 |
| 2012/0303790 A1 | 11/2012 | Singh et al. | |
| 2014/0036722 A1* | 2/2014 | Giloh | H04L 12/4633 370/254 |

\* cited by examiner

FIG. 3

| ROUTING TABLE 136 | | |
|---|---|---|
| Messaging Network Address | Destination | Next Router |
| <VLAN1><IP Address3> — 302 | Client 122 | Router 124 |
| <VLAN1><IP Address4> — 304 | Client 152 | Router 164 |
| ••• | | |

OVERLAY NETWORK OVER A MESSAGING NETWORK

FIELD OF DISCLOSURE

The present disclosure generally relates to a computing system, and more particularly to a networked computing system.

BACKGROUND

The latest trend in enterprise Information Technology (IT) is the rapid adoption of the cloud computing paradigm. Cloud computing follows the enterprise adoption of virtualization technology to gain greater utilization of physical resources as well as increased operational efficiencies.

An objective of an open hybrid cloud model is to allow complete flexibility for the provisioning of application workloads across private and public cloud resource providers according to changing business objectives. One of the greatest challenges in realizing the benefits of the cloud computing operational model is in overcoming the discontinuities of data center and network boundaries across private and public cloud resource providers. These discontinuities frequently require compensation in the application software and workloads intended for the cloud resulting in increased complexity and operational burdens, which lessen the benefits of moving to the cloud.

The concept of software defined networking technologies has emerged as a means to address these boundaries across private and public cloud providers. Leading cloud technology companies have spent billions of dollars to acquire aspiring startup companies that provide technologies and products for this space. These technologies address the physical discontinuities encountered in private and public cloud infrastructure but also introduce significant complexity in the applications developed for the cloud that discover and configure the networking "plane" in which the cloud workloads operate. Additionally, the administration, monitoring, and management of the networking environment are made additionally complex by the real-time operation of the software defined network environment.

BRIEF SUMMARY

This disclosure relates to networked computing systems. Methods, systems, and techniques for sending a message over a network are disclosed.

According to an embodiment, a system for sending a message over a network includes a first network interface that is assigned a first Internet Protocol (IP) address. The network interface is linked to a logical network. The system also includes a messaging protocol module that obtains a first message to be sent over a messaging network to a target system linked to the logical network. The message protocol module generates a second message by encapsulating, based on a messaging protocol, the first message, and determines a destination address for the second message. The destination address includes a text string and a second IP address of the target system. The system further includes a second network interface that sends over the messaging network the second message having the destination address. The messaging network is based on the messaging protocol.

According to another embodiment, a method of sending a message over a network includes obtaining, by one or more processors, a first message to be sent over a messaging network to a target system. The method also includes generating a second message by encapsulating, based on a messaging protocol, the first message, where generating the second message includes determining a destination address for the second message. The destination address includes a text string and an Internet Protocol (IP) address of the target system. The system further includes sending over the messaging network the second message having the destination address. The messaging network is based on the messaging protocol.

According to another embodiment, a non-transitory machine-readable medium including a plurality of machine-readable instructions that when executed by one or more processors is adapted to cause the one or more processors to perform a method including: obtaining, by one or more processors, a first message to be sent over a messaging network to a target system; generating a second message by encapsulating, based on a messaging protocol, the first message, where generating the second message includes determining a destination address for the second message, the destination address including a text string and an Internet Protocol (IP) address of the target system; and sending over the messaging network the second message having the destination address, the messaging network being based on the messaging protocol.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIG. 3 is a simplified block diagram illustrating a routing table included in a messaging protocol router, according to an embodiment.

DETAILED DESCRIPTION

I. Overview
II. Example System Architecture
   A. Messaging Network
   B. Endpoints on Messaging Network
      1. Network Connections
      2. Disjoint Network and Horizontal Groupings
   C. Message Routing Based on Overlay Network Messaging Scheme
III. Example Message Processing
   A. Message Processing Based on the Overlay Network Messaging Protocol B. Message Routing
IV. Example Method
V. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

This disclosure describes using an overlay network to send and receive messages by leveraging an existing network infrastructure (e.g., Internet Protocol (IP) network) that has already been optimized for performance and availability by enterprise and network providers. It accomplishes this with no additional complexity for the applications developed for the cloud. Aspects of this disclosure may be used to implement a messaging infrastructure and to bridge communication between components. For example, this disclosure may be used to address the physical and networking discontinuities of private and public resource providers. This disclosure may also be used in other applications.

The overlay network may define a convention for generating messaging addresses to be sent over the messaging network. The overlay network may be thought of as a logical network implemented on top of an underlying network. Each node in the overlay network also exists in the underlying network and processes and/or forwards packets in an application-specific way. Multiple overlay networks can exist on top of the same underlying network—each implementing its own application-specific behavior—and overlays can be nested, one on top of another.

II. Example System Architecture

Figure 1:
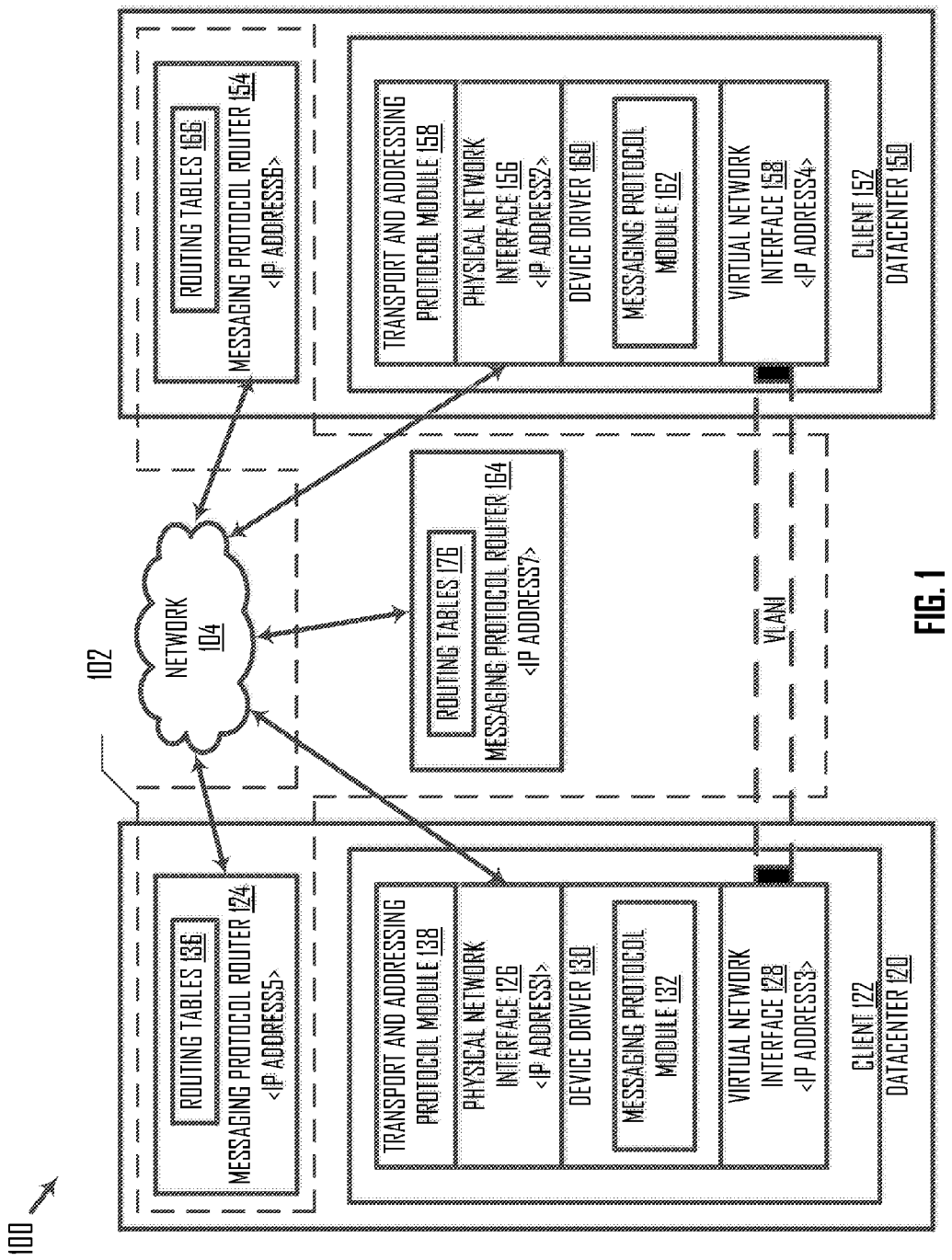
FIG. 1 is a simplified block diagram illustrating a system for sending a message over an overlay network, according to an embodiment.

FIG. 1 is a simplified block diagram illustrating a system 100 for sending a message over an overlay network, according to an embodiment.

System 100 includes an overlay messaging network 102 on top of underlying network 104. Network 104 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

In an example, network 104 is the Internet, which uses an IP addressing scheme to route packets. An IP address typically consists of two parts, usually referred to as a network part and a host part. The network part of an IP address identifies the network to which the host is attached; all hosts attached to the same network have the same network part in their IP address. The host part then identifies each host uniquely on that particular network. IP addresses typically use a numeric addressing scheme.

A. Messaging Network

Messaging network 102 is based on a messaging protocol that allows text-based addressing. Messaging network 102 includes a mesh of messaging protocol routers that are based on the messaging protocol. Messaging protocol routers on messaging network 102 deliver messages to their intended destinations based on a messaging address using the messaging protocol.

In the example, messaging network 102 is an Advanced Message Queuing Protocol (AMQP) network based on AMQP, and network 104 is an IP network. AMQP is an open messaging standard for passing messages between applications or organizations. AMQP may connect systems across organizations (e.g., applications in different organizations) and technologies (e.g., applications on different platforms). AMQP may also connect across time because it may be unnecessary for systems to be available simultaneously and may also connect across space because AMQP may reliably operate at a distance, or over poor networks.

In another example, messaging network 102 is a Simple Text Oriented Messaging Protocol (STOMP) network based on STOMP, and network 104 is an IP network. STOMP may provide an interoperable wire format so that STOMP clients can communicate with any STOMP message broker to provide messaging interoperability among many languages, platforms, and brokers.

Messaging network 102 may use an abstract messaging scheme that includes an arbitrary text string as an address for an end point on the messaging network. For instance, the destination address for a message based on the messaging network protocol may be the IP address assigned to the virtual network interface of the target system concatenated to a text string. Messaging network 102 may span across multiple datacenters and the globe, and may enable client computing devices in different locations to directly communicate, even if the devices are on private IP networks.

Messaging network 102 may be unaware of the message content that is forwarded and it may be unnecessary for messaging protocol routers to have knowledge of the IP protocol. The messaging protocol routers simply route messages according to the addresses based on the messaging protocol. Overlay networks can be created, destroyed, and expanded very quickly and easily without any reconfiguration of the underlying IP networking gear.

B. Endpoints on Messaging Network

Datacenter 120 includes a client 122 and a messaging protocol router 124 that are linked to network 104. Datacenter 150 includes a client 152 and a messaging protocol router 154 that are also linked to network 104. Datacenters 120 and 150 may be located at different geographical sites, and messaging network 102 may enable communications between systems in the datacenters using the techniques described in this disclosure.

1. Network Connections

Client 122 includes a physical network interface 126 and a virtual network interface 128. Physical network interface 126 is assigned IP Address 1 and receives packets over network 104. A packet may refer to a discrete chunk of data and may also be referred to as a message or datagram in this disclosure. Virtual network interface 128 is assigned IP Address 3 and is linked to a network such as messaging network 102. IP Address 1 is a physical IP address on the Internet, and IP Address 3 is a virtual IP address. Physical network interface 126 and virtual network interface 128 may be on different subnets so that traffic may be redirected accordingly.

Client 152 includes a physical network interface 156 and a virtual network interface 158. Physical network interface 156 is assigned IP Address 2 and receives packets over network 104. Virtual network interface 158 is assigned IP Address 4 and is linked to a network such as messaging network 102. IP Address 2 is a physical IP address on the Internet, and IP Address 4 is a virtual IP address. Physical network interface 156 and virtual network interface 158 may be on different subnets so that traffic may be redirected accordingly.

Physical IP addresses 1 and 2 are in different address spaces from virtual IP addresses 3 and 4. IP Addresses 3 and 4 may be linked to an isolated network and may be accessible only via VLAN1. A physical network interface may be on a constrained network and only able to communicate within its own datacenter and to servers in other datacenters. As such, the physical network interface may be unable to communicate with other clients in different datacenters.

Messaging network 102 may enable communication between clients in different datacenters. Messaging network 102 is associated with one or more virtual networks, each virtual network having its own address space. The logical network may be attached to computing devices belonging to a horizontal grouping of associated computing devices. In an example, the logical network may be linked to the virtual network interfaces of each of the computing devices in the horizontal grouping of associated computing devices. The logical network may be used as a bridge to communicate with other computing devices on the logical network. The bridge may be a virtual configuration, and the computing devices that are assigned to the logical network may communicate via the physical and virtual network interfaces of the respective computing device.

2. Disjoint Network and Horizontal Groupings

The following is a description of client 122. This description applies as well to client 152. Client 122 includes a device driver 130. In an embodiment, device driver 130 identifies virtual network interface 128 as being associated with a logical network and links virtual network interface 128 to a horizontal grouping of associated computing devices of the logical network. The horizontal grouping of associated computing devices is linked to the logical network, and the text string may be an indication of the horizontal grouping of associated computing devices. When virtual network interface 128 is initialized, it may have an IP Address (e.g., IP Address 3) and may be configured with a VLAN name (e.g., VLAN1). In an example, the horizontal grouping of associated computing devices is a virtual local area network (VLAN), and the text string indicates the particular VLAN (e.g., VLAN name or VLAN location).

In FIG. 1, clients 122 and 152 are both linked to VLAN1 and receive messages having a destination address including VLAN1. As such, each computer system (virtual or bare-metal) that participates in the overlay network may have a unique messaging address indicating its VLAN and IP address. The notion of VLAN allows for the existence of many isolated and independent overlay networks to exist simultaneously on the same flat messaging network 102 (e.g., an AMQP network).

Device driver 130 includes a messaging protocol module 132 that enables client 122 to communicate with nodes over messaging network 102. Messaging protocol module 132 may encapsulate and de-encapsulate IP messages based on a messaging protocol. In an example, if client 122 generates a message and the messaging protocol is AMQP, messaging protocol module 132 may encapsulate the message as an AMQP message having a destination address including the text string and the virtual IP address of the target system. Similarly, if client 122 receives a message and the messaging protocol is AMQP, messaging protocol module 132 may de-encapsulate the AMQP message having a destination address including the text string and virtual IP address 3, and process the AMQP message accordingly.

Messaging protocol module 132 may be available to computing devices. In an example, client 122 downloads messaging protocol module 132 over network 104. In another example, a user installs messaging protocol module 132 onto client 122. Messaging protocol module 132 may enable client 122 access to an entire network via virtual network interface 128. The messaging protocol module may also be included in other computing devices (e.g., other client computing devices or servers) to enable these computing devices access to the same network.

Using a VLAN name as the text string may provide an advantage because the selection of the VLAN maintains a concept already present on client 122. Client 122 may expect a model in which client 122 links into the VLAN based on the virtual network to which virtual network interface 128 connects. Further, the use of the VLAN as the text string shall ensure separation of different horizontal groupings of computing devices.

Although a VLAN is described as being the horizontal grouping of associated computing devices, this is not intended to be limiting. The horizontal grouping of associated computing devices can be any east-west grouping of computing devices, such as, for example, an organization's name or an arbitrary text string.

C. Message Routing Based on Overlay Network Messaging Scheme

Each of messaging protocol routers 125, 154, 164 includes one or more routing tables that include one or more mappings. Each mapping may map an address based on the text-based messaging protocol (e.g., a text string and an IP address) to a node on messaging network 102, and the messaging protocol router routes messages based on the routing table. As such, the messaging protocol router may be a specific router that understands the messaging protocol and may be different from an IP router on network 104.

Device driver 130 may notify messaging protocol router 124 of virtual network interface 128 by registering a messaging address including IP address 3 and VLAN1 with messaging protocol router 124. Messaging protocol router 124 inserts a mapping from the registered address to client 122. In an example, client 122 uses IP Address 1 and establishes a TCP (Transmission Control Protocol) connection to messaging network 102 via messaging protocol router 124. Using the TCP connection, client 122 may send the messaging address including IP address 3 and VLAN1 to messaging protocol router 124 along with an indication that messages with this destination address should be routed to client 122. Messaging protocol router 124 may then be aware of client 122 as a messaging protocol client and enable message routing to and from client 122 using messaging network 102. The TCP connection may remain open and include the addressing information. Accordingly, when messaging protocol router 124 receives a message having a destination address including IP address 3 and VLAN1, messaging protocol router 124 may forward the message to client 122. It may be unnecessary for messaging protocol router 124 to understand the virtual address space. When client 122 receives a message, device driver 130 may assist in processing the message, as described in this disclosure. Messaging protocol router 124 may determine the physical IP address of client 122 via the open TCP connection between client 122 and messaging protocol router 124, and forward the message accordingly. A first TCP connection may be established for the reception of messages over messaging network 102, and a second TCP connection may be established for sending messages over messaging network 102.

Messaging protocol router 124 may also forward client 122's registered address to other messaging protocol routers (e.g., messaging protocol routers 166 and 176) on messaging network 102. As such, these messaging protocol routers may insert the mapping into their routing tables. Accordingly, when messages having the destination address including IP address 3 and VLAN1 are received, the messaging protocol routers may forward the message to messaging protocol router 124 or to a messaging protocol router closer to messaging protocol router 124.

Messaging protocol router 124 uses IP Address 5 and may establish a TCP connection to, for example, messaging protocol router 164. Using the TCP connection, messaging protocol router may send the messaging address including IP address 3 and VLAN1 to messaging protocol router 164 along with an indication that messages with this destination address should be routed to client 122. Messaging protocol router 164 may then be aware of client 122 as a messaging protocol client and enable message routing to and from client 122 using messaging network 102. The TCP connection may remain open and include the addressing information. Accordingly, when messaging protocol router 164 receives a message having a destination address including IP address 3 and VLAN1, messaging protocol router 164 may forward the message to messaging protocol router 124 via the open TCP connection. Messaging protocol router 164 may determine the physical IP address of messaging protocol router 124 via the open TCP connection between messaging protocol routers 124 and 164, and forward the message accordingly.

As discussed above, the routing of packets may occur in the context of the TCP connections. In an example, the messaging protocol router 124 communicates with client 122 and messaging protocol router 164 via the connections. Messaging protocol router 124 may send a message to client 122 through the socket associated with the TCP connection between client 122 and messaging protocol router 124. Similarly, messaging protocol router 124 may send a message to messaging protocol router 164 through the socket associated with the TCP connection between messaging protocol router 124 and messaging protocol router 164. As such, it may be unnecessary for messaging protocol router 124 or messaging protocol router 164 to include a routing table having mappings from a physical IP Address to another node in messaging network 102.

In an embodiment, messaging protocol module 132 obtains a first message to be sent over messaging network 102 to virtual network interface 158 in client 152. In an example, the first message is an application payload generated by an application executing on client 122. The application executing on client 122 (not shown) may communicate through virtual network interface 128, which then communicates with device driver 130.

Messaging protocol module 132 may generate a second message by encapsulating, based on the messaging protocol, the first message, and determine a destination address for the second message. In an example, the destination address includes a text string and an IP address of the target system. Physical network interface 126 may then send over messaging network 102 the second message having the destination address (e.g., <VLAN1><IP Address 4> intended for virtual network interface 158 in client 152). Device driver 130 may then communicate with physical network interface 128 to ensure that the message is properly sent over the network.

Messaging protocol routers 124, 154, and 164 are on messaging network 102 and forward messages received. Messaging protocol routers 124, 154, and 164 have IP addresses that enable nodes on network 104 to route IP datagrams to the messaging protocol routers. Messaging protocol router 124 is assigned IP Address 5, messaging protocol router 154 is assigned IP Address 6, and messaging protocol router 164 is assigned IP Address 7.

Messaging protocol router 124 may be thought of as a messaging protocol start point and endpoint within datacenter 120. As such, messages to be sent over messaging network 102 from source systems in datacenter 120 may first be routed from the source system to messaging protocol router 124. Messaging protocol router 124 may then forward, based on the destination address associated with the messaging protocol, the message to another messaging protocol router (e.g., messaging protocol router 164). Similarly, messages received over messaging network 102 from source systems outside of datacenter 120 and intended for target systems in datacenter 120 may be eventually routed to messaging protocol router 124 in datacenter 120. Messaging protocol router 124 may then forward, based on the destination address associated with the messaging protocol, the message to a target system within datacenter 120.

III. Example Message Processing

In an example, the messaging protocol is STOMP, and messaging protocol routers 124, 154, and 164 are STOMP routers. These STOMP routers may be unaware of how IP routing is implemented and may route based on the STOMP address included in the message to be sent over messaging network 102.

In another example, the messaging protocol is AMQP, and messaging protocol routers 124, 154, and 164 are AMQP routers. These AMQP routers may be unaware of how IP routing is implemented and may route based on the AMQP address included in the message to be sent over messaging network 102.

1. Message Processing Based on the Overlay Network Messaging Protocol

Figure 2:
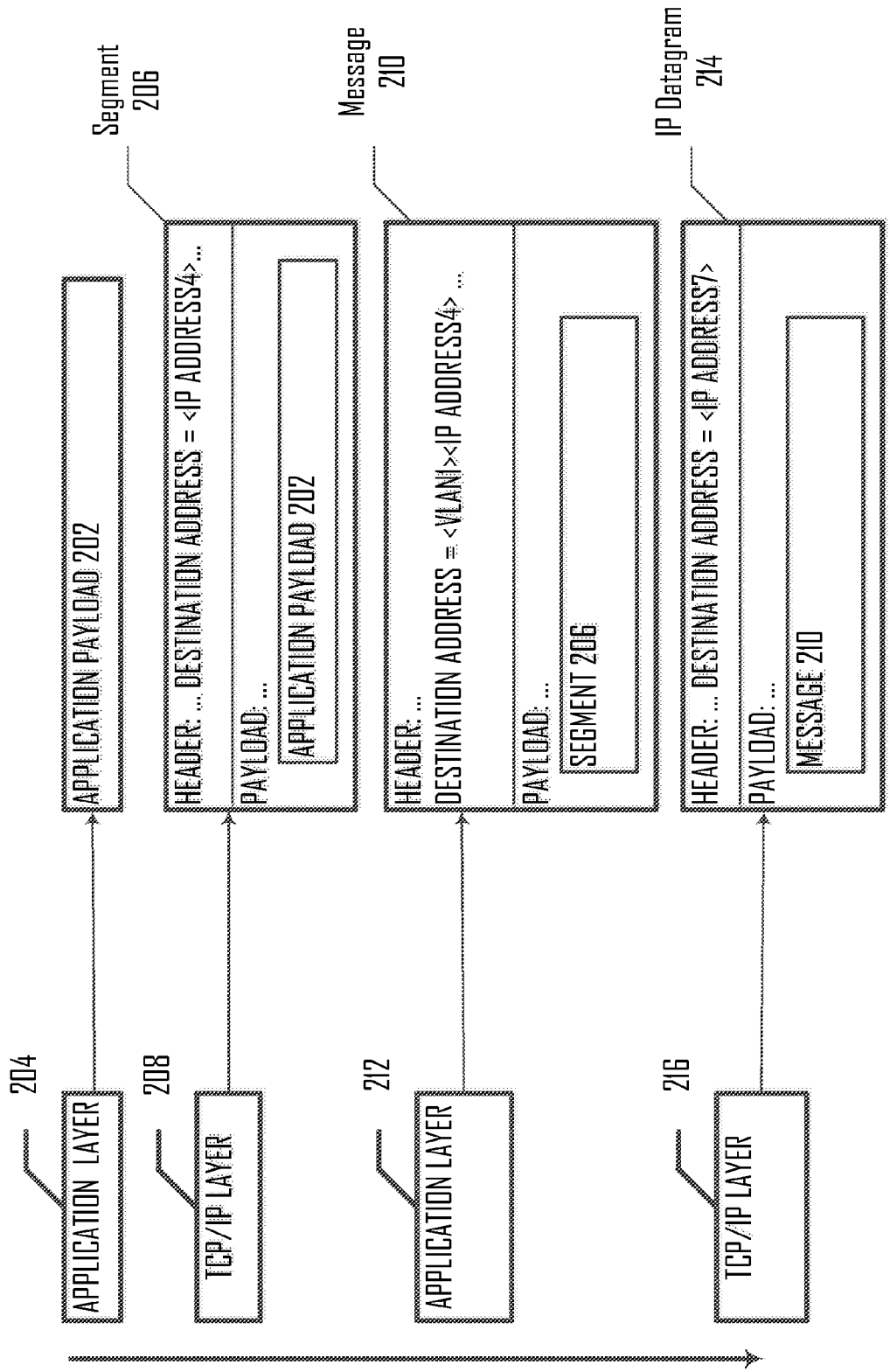
FIG. 2 is a simplified block diagram illustrating message processing for sending a message over the overlay network, according to an embodiment.

FIG. 2 is a simplified block diagram 200 illustrating message processing for sending a message over messaging network 102, according to an embodiment.

Diagram 200 includes an application payload 202 that is generated at a step 204 at an application layer. Virtual network interface 128 in client 122 may desire to send application payload 202 to virtual network interface 158 in client 152. Before application payload is sent, client 122 may encapsulate application payload 102 one or more times based on the protocols implemented in networks 102 and 104.

The application layer is bound to a TCP/IP layer and has a socket that uses IP Address 1, the physical IP Address of physical network interface 126 in client 122. Client 122 includes a transport and addressing protocol module 138 that generates a segment 206 by encapsulating, based on TCP/IP, application payload 202 and determines a destination address for segment 206. Application payload 202 is encapsulated in segment 206 at a step 208 at the TCP/IP layer. Segment 206 includes a header having a destination address of IP Address 4 (virtual network interface 158 of client 152) and a payload including application payload 202.

Messaging protocol module 132 may generate message 210 by encapsulating, based on the messaging protocol used by messaging protocol module 132, segment 206 and may determine a destination address for message 210. The destination address for message 210 is different from the destination address for segment 206. Segment 206 is encapsulated in message 210 at a step 212 at the application layer. The application layer also includes the messaging protocol layer. The destination address for message 210 is a unique address that identifies client 152 and logically represents a network interface that uses a messaging structure that is transparent to client 122. Message 210 includes a header having a destination address of <VLAN1><IP Address 4> (virtual network interface 158 of client 152 concatenated to a text string that is associated with messaging network 102) and a payload including segment 206. In this example, clients 122 and 152 may be linked to a VLAN named VLAN1, and the text string is the VLAN name.

Transport and addressing protocol module 138 may generate an IP datagram 214 by encapsulating, based on TCP/IP, message 210, and may determine a destination address for IP datagram 214. Message 210 is encapsulated in IP datagram 214 at a step 216 at the TCP/IP layer. The destination address for IP datagram 214 is an IP address for a messaging protocol router on the messaging network. IP datagram 214 includes a header having a destination address of IP Address 7 (IP address for messaging protocol router 124 in datacenter 120) and a payload including message 210. Accordingly, messaging protocol router 124 receives IP datagram 214.

Transport and addressing protocol module 138 may be unaware of the messaging structure used by the messaging protocol layer. Similarly, physical network interface 126 may also be unaware of the messaging structure used by the messaging protocol layer. Although physical network interface 126 sends IP datagram 214 including message 210 over messaging network 102, it may be unnecessary for physical network interface 126 to know that IP datagram 216 is being sent through messaging network 102 as opposed to a normal network path connection (e.g., network 104). In an embodiment, an endpoint of messaging network 102 includes a messaging protocol module that is aware of the messaging scheme used by messaging network 102 and translates the message accordingly. In this embodiment, as along as the endpoints are adjusted to include the messaging protocol module, it may be unnecessary to adjust other nodes in messaging network 102 or other components in the endpoint.

In an example, client 122 includes an operating system (OS) (not shown), and when these messages are offered to client 122's OS through a standard networking interface, the addressing schemes integrate seamlessly into the OS. The "lower" TCP/IP layer at step 208 may be stable and configured in a classic "north/south" configuration where endpoints communicate with data centers. This network may not need new management capability or software defined networks. The "upper" TCP/IP layer at step 216 can be configured and reconfigured with ease, can reach across discontinuities in the underlying network, and support the "east/west" traffic flow to bridge communication in hybrid cloud environments. Messaging network 102 enables a flexible addressing scheme to carry IP datagrams.

2. Message Routing

A path of IP datagram 214 to client 152 may be based on the destination address of message 210. In an example, a messaging protocol router that receives IP datagram 214 may identify the destination address of message 210 and then determine a messaging protocol router or client to forward IP datagram 214 to that is closer to the destination address of message 210. Messaging protocol router 124 includes a routing table 136 that includes one or more mappings.

FIG. 3 is a simplified block diagram illustrating a routing table 136 included in messaging protocol router 124, according to an embodiment. Routing table 136 includes three columns including a first column including the messaging network address, a second column including the target, and a third column including the next router to which to send the message so that the message eventually arrives at the target. Routing table 136 includes an entry 302 that maps messaging network address <VLAN1><IP Address 3> to target client 122 and also indicates router 124 as the next router to which to send the message so that the message eventually arrives at the target. Accordingly, if messaging protocol router 124 receives a message having a destination address of <VLAN1><IP Address 3>, messaging protocol router 124 forwards the message to client 122.

Routing table 136 also includes an entry 304 that maps messaging network address <VLAN1><IP Address 4> to target client 152 and also indicates router 164 as the next router to which to send the message so that the message eventually arrives at the target. Accordingly, if messaging protocol router 124 receives a message having a destination address of <VLAN1><IP Address 4>, messaging protocol router 124 forwards the message to messaging protocol router 164 (another messaging protocol router that is closer to client 152).

When messaging protocol router 124 receives IP datagram 214 in FIG. 2, messaging protocol router 124 may strip off IP datagram 214's header and identify message 210's destination address <VLAN1><IP Address 4>, which maps to client 152 in datacenter 150. Taking into consideration that client 152 in datacenter 150 is the target system, messaging protocol router 124 determines a next messaging protocol router that is closer to client 152. In an example, messaging protocol router 124 determines that messaging protocol router 164 is closer to client 152. Messaging protocol router 164 is assigned IP Address 7, and messaging protocol router 124 may encapsulate message 210 in an IP datagram having a destination address of IP Address 7 and forward the IP datagram over messaging network 102.

Messaging protocol router 164 includes a routing table 176 that maps <VLAN1><IP Address 4> to client 152 in datacenter 150. When messaging protocol router 164 receives the IP datagram from messaging protocol router 124, messaging protocol router 164 may strip off the IP datagram's header and identify message 210's destination address, <VLAN1><IP Address 4>. Taking into consideration that client 152 in datacenter 150 is the target system, messaging protocol router 124 determines a next messaging protocol router that is closer to client 152. In an example, messaging protocol router 164 determines that messaging protocol router 154 is closer to client 152. Messaging protocol router 154 is assigned IP Address 6, and messaging protocol router 164 may encapsulate message 210 in an IP datagram having a destination address of IP Address 6 and forward the IP datagram over network 104.

In another example, message 210 may be sent to multiple messaging protocol routers before being sent to messaging protocol router 154 in datacenter 150. In this example, each messaging protocol router that receives the IP datagram may strip the header and include a new header having a destination address of a messaging protocol router closer to the target system. Message 210 may eventually make it to messaging protocol router 154, the endpoint in datacenter 150 and may be de-encapsulated at the target system.

Messaging protocol router 154 includes a routing table that maps <VLAN1><IP Address 4> to client 152. When messaging protocol router 154 receives the IP datagram from messaging protocol router 164, messaging protocol router 154 may strip off the IP datagram's header and identify message 210∝s destination address <VLAN1><IP Address 4>. Messaging protocol router 154 may recognize that client 152 is also in datacenter 150 and encapsulate message 210 in an IP datagram having a destination address of physical network interface 156 of client 152. Messaging protocol router 154 may forward the IP datagram to client 152 (e.g., via an open TCP connection between client 152 and messaging protocol router 154 that includes client 152's physical IP address).

Client 152 may receive the IP datagram having a destination address of IP Address 2 from messaging protocol router 154 via physical network interface 156. The IP datagram includes message 210 having destination address <VLAN1><IP Address 4>. Physical network interface 156 receives packets intended for itself and/or virtual network interface 158. Device driver 160 recognizes that the message is not intended for physical network interface 156. For example, device driver may recognize that the destination address of the message has a different subnet than physical network interface 156's subnet.

Messaging protocol module 162 may de-encapsulate, based on the messaging protocol, message 210. Device driver 130 may then process the packet and forward it to virtual network interface 158.

As discussed above and further emphasized here, FIGS. 1-3 are merely examples, which should not unduly limit the scope of the claims. For example, although system 100 is described herein with reference to datacenter 120 including one client and datacenter 150 including one client, each of datacenters 120 and 150 may include more than one client. Further, each of datacenters 120 and 150 may include one or more servers that are linked to messaging network 102 without departing from the spirit and scope of the disclosure. A plurality of individual private networks that are disjoint from each other and have their own address space may be provisioned using the addressing scheme that is described in the present disclosure. For example, although FIG. 1 depicts a point-to-point connection between client 122 and 152, this is not intended to be limiting. Client 122 may be linked to a plurality of computing devices over messaging network 102, providing flexibility to send message to and receive messages from other computing devices linked to messaging network 102.

Figure 4:
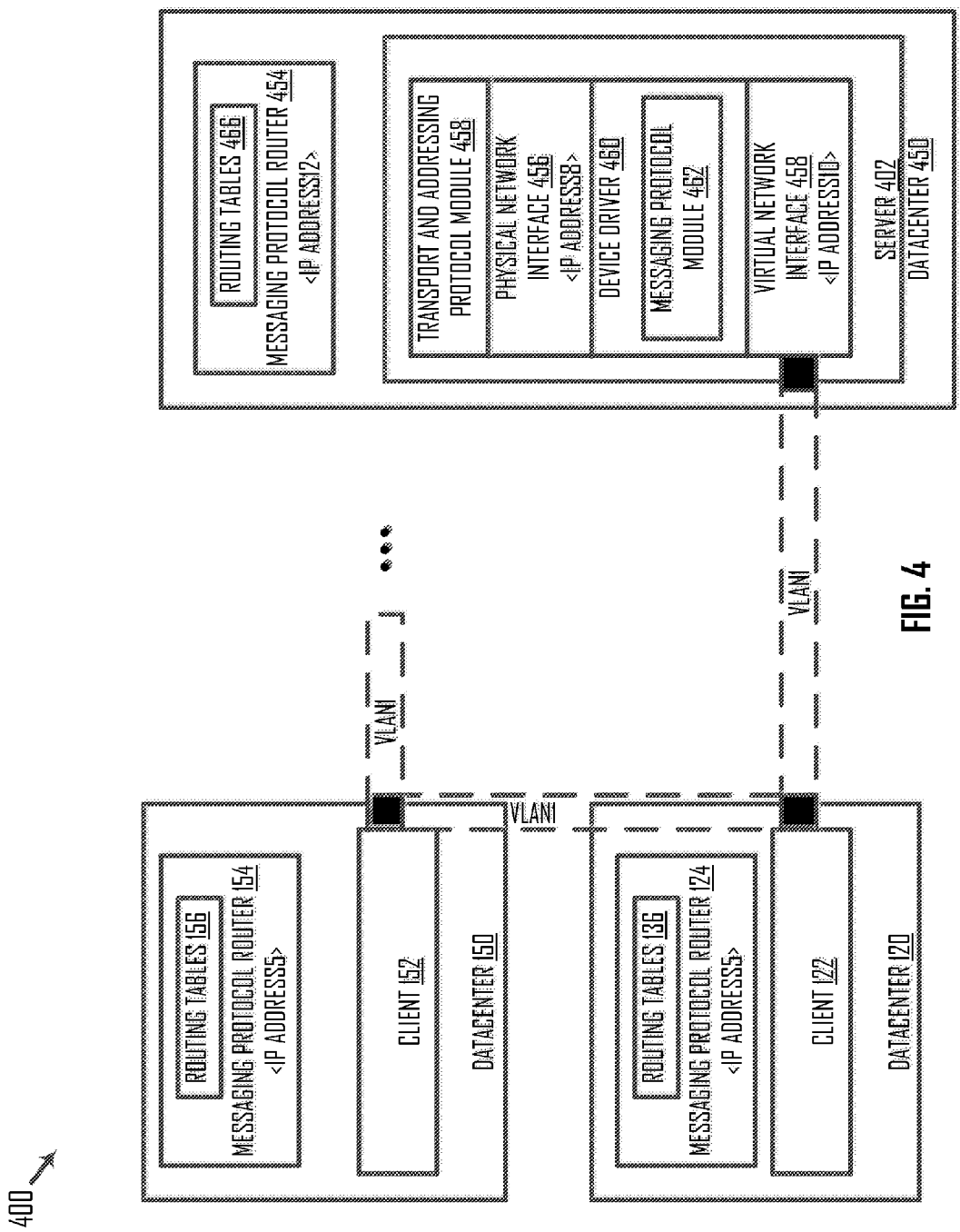
FIG. 4 is a simplified block diagram illustrating a system for sending a message over an overlay network, according to an embodiment.

For example, FIG. 4 is a simplified block diagram illustrating a system 400 for sending a message over an overlay network, according to an embodiment. System 400 includes clients 122 and 152 linked to VLAN1. System 400 also includes a datacenter 450 including server 402 and messaging protocol router 454. Server 402 is linked to VLAN1 and includes a transport and addressing protocol module 458, physical network interface 456 assigned to physical IP Address 8, device driver 460 including messaging protocol module 462, and a virtual network interface assigned to virtual IP Address 10. Messaging protocol router 454 includes routing tables 466 and is assigned physical IP Address 12.

Additionally, client 122 and/or server 402 may include a second virtual network interface (not shown) that is linked to VLAN1. In another example, client 122 and/or server 402 may include a second virtual network interface that is linked to a different VLAN (e.g., VLAN2). In this example, client 122 may be linked to a plurality of other computing devices that sends messages over messaging network 102 to client 122 using, for example, a destination address including <VLAN2><IP Address 3>. Client 122 may also send messages from the second virtual network interface over messaging network 102 to the plurality of other computing devices via physical network interface 126.

Further, it should be understood that a client and server may be in a different datacenter than that illustrated in the figures. For example, datacenter 120 may include both clients 122 and 152. In another example, datacenter 450 includes server 402 and client 122. In another example, each computing device that is linked to messaging network 102 is within the same datacenter.

Moreover, one or more modules and/or components in FIGS. 1 and 4 may be combined with another module. In an example, transport and addressing protocol module 138 and messaging protocol module 132 are combined into a single module. Additionally, one or more modules and/or components in FIGS. 1 and 4 may be separated into more than one module. In an example, messaging protocol module 132 is split into a first messaging protocol module and a second messaging protocol module. Further, each of the computing devices may include one or more physical network interfaces and/or one or more virtual network interfaces.

Furthermore, although client 122 is described as sending the message to client 152, and client 152 is described as being the target system, this is not intended to be limiting. In another example, client 152 may send a message to client 122, and client 122 may be the target system.

IV Example Method

Figure 5:
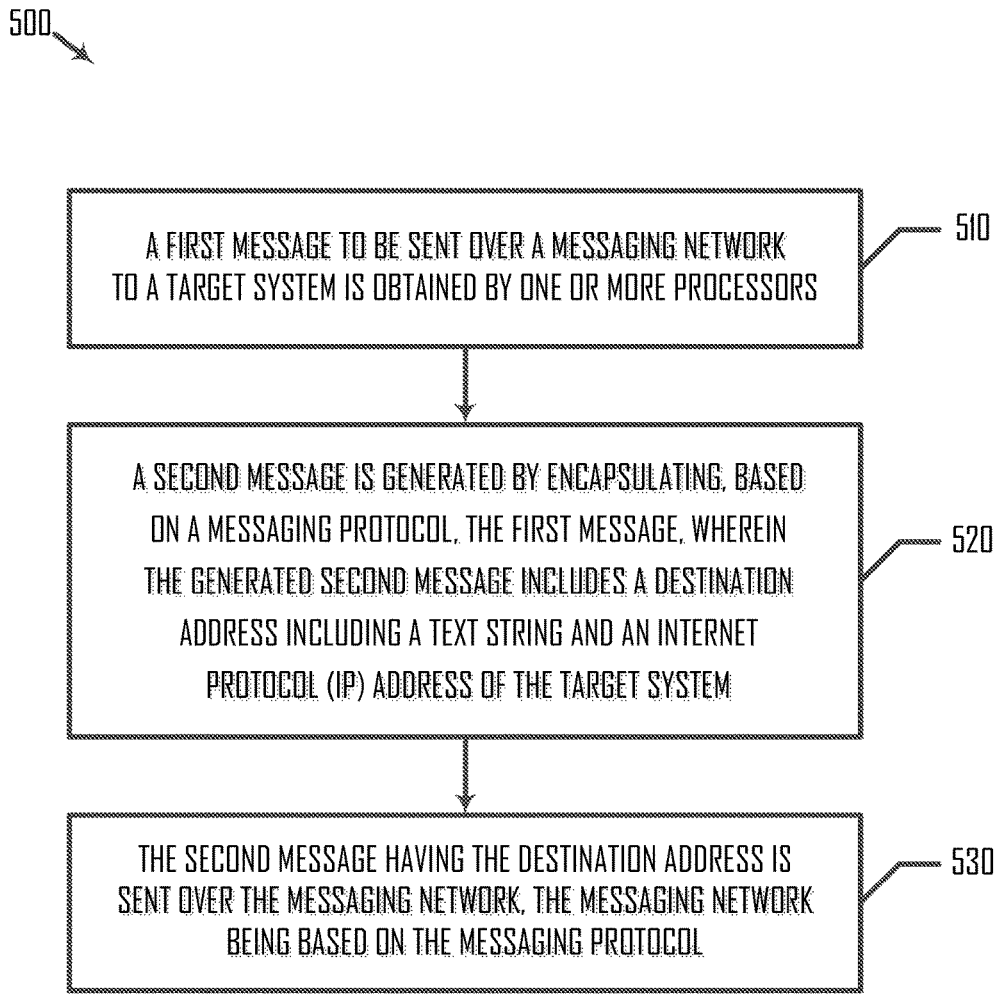
FIG. 5 is a simplified flowchart illustrating a method of sending a message over an overlay network, according to an embodiment.

FIG. 5 is a simplified flowchart illustrating a method 500 of sending a message over an overlay network, according to an embodiment. Method 500 is not meant to be limiting and may be used in other applications.

Method 500 includes steps 510-530. In a step 510, a first message to be sent over a messaging network to a target system is obtained by one or more processors. In an example, messaging protocol module 132 obtains, by one or more processors, a first message to be sent over a messaging network to a target system.

In a step 520, a second message is generated by encapsulating, based on a messaging protocol, the first message, where the generated second message includes a destination address including a text string and an IP address of the target system. In an example, messaging protocol module 132 generates a second message by encapsulating, based on a messaging protocol, the first message, where generating a second message includes determining a destination address for the second message, the destination address including a text string and an IP address of the target system.

In a step 530, the second message having the destination address is sent over the messaging network, the messaging network being based on the messaging protocol. In an example, physical network interface 126 sends over the messaging network the second message having the destination address, the messaging network being based on the messaging protocol.

It is also understood that additional method steps may be performed before, during, or after steps 510-530 discussed above. It is also understood that one or more of the steps of method 500 described herein may be omitted, combined, or performed in a different sequence as desired.

V. Example Computing System

Figure 6:
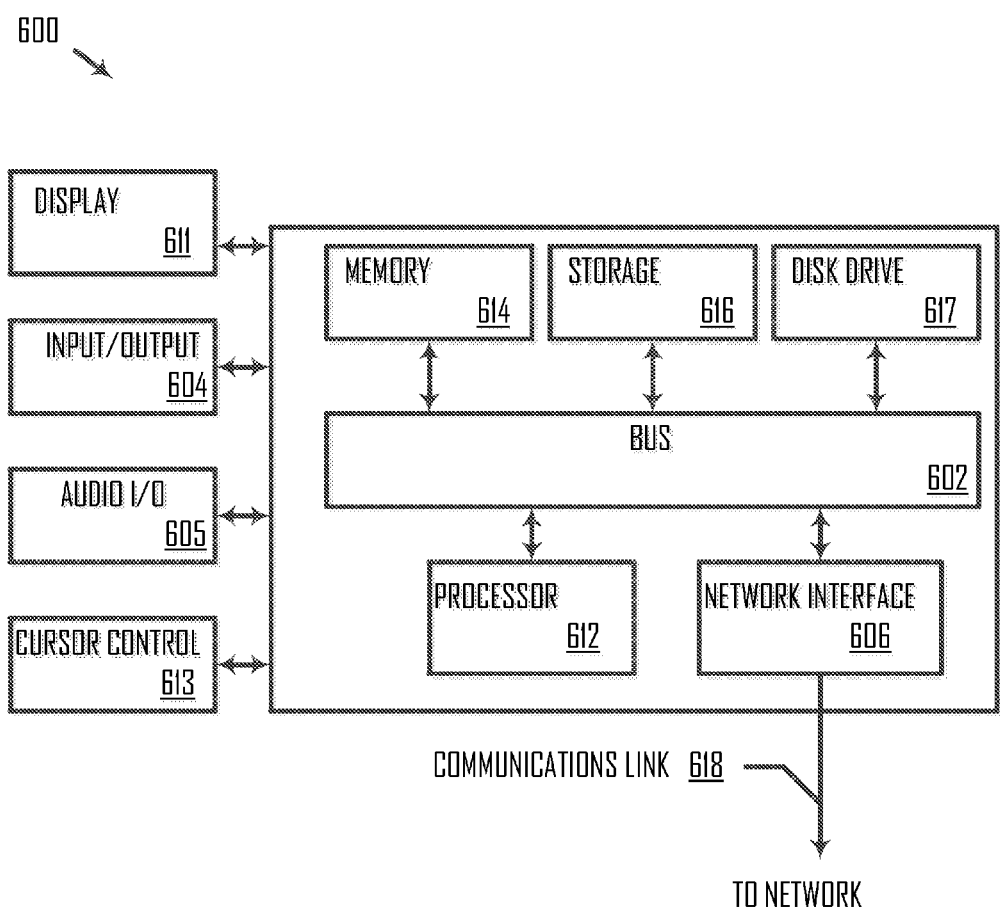
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, clients 122 and 152 and/or messaging protocol routers 124, 154, and 164 may include one or more processors. Clients 122 and 152 and/or messaging protocol routers 124, 154, and 164 may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for sending a message over a network, the system comprising:
    a first network interface that is assigned a first Internet Protocol (IP) address and is linked to a logical network;
    a transport and addressing protocol module that generates, by one or more processors, a segment having a first header and a first payload, wherein the first payload includes an application payload to be sent over a messaging network to a target system, a second IP address is assigned to a virtual network interface that is linked to the logical network and included in the target system, and the first header specifies the second IP address as a first destination address for the segment;
    a messaging protocol module that generates, by one or more processors, a message by encapsulating, based on a messaging protocol, the segment and determines a second destination address for the message, wherein the message includes a second header and a second payload, wherein the second header specifies the second destination address including a text string concatenated with the second IP address, and wherein the second payload includes the segment,
    wherein the transport and addressing protocol module generates, by one or more processors, a datagram having a third header and a third payload, wherein the third header specifies a third destination address for the datagram and the third destination address is different from the first and second destination addresses, and wherein the third payload includes the message; and a physical network interface that sends over the messaging network the datagram having the third destination address, wherein the messaging network is based on the messaging protocol.

2. The system of claim 1, wherein the text string identifies the logical network.

3. The system of claim 1, further comprising:
one or more messaging protocol routers on the messaging network, each messaging protocol router including a routing table that includes one or more mappings, wherein each mapping maps an address including a text string and an IP address to a node on the messaging network, and the one or more messaging protocol routers forwards messages based on the routing table.

4. The system of claim 1, wherein the transport and addressing protocol module the segment by encapsulating, based on TCP/IP (Transmission Control Protocol/Internet Protocol), the application payload,
wherein the transport and addressing protocol module generates the datagram by encapsulating, based on TCP/IP, the message, and determines the third destination address for the datagram, wherein the third destination address is an IP address for a router on the messaging network, and
wherein a path of the datagram to the target system is based on the second destination address.

5. The system of claim 1, wherein the transport and addressing protocol module generates the datagram by encapsulating, based on TCP/IP, the message, the system further comprising:
a client computing device residing in a data center and including the first network interface, messaging protocol module, transport and addressing protocol module, and physical network interface,
wherein the first network interface is a virtual network interface and the first IP address is a virtual IP address, and
wherein the data center includes a messaging protocol router that is assigned the third destination address, and the third destination address is an IP address.

6. The system of claim 5, wherein the target system is a second client computing device residing in a second data center different from the first data center, the second data center includes a second messaging protocol router including a routing table having a mapping from the second destination address of the message to the target system, and the second messaging protocol router receives the message and forwards the message to the target system.

7. The system of claim 1, further comprising:
a device driver that registers with a messaging protocol router a fourth destination address including the text string and the first IP address, wherein the first IP address is a virtual IP address,
wherein the physical network interface is assigned a physical IP address and receives an IP datagram having a destination address of the physical IP address, the IP datagram includes a second message having the fourth destination address including the text string and the first IP address as a destination address for the second message.

8. The system of claim 1, wherein the messaging protocol is Advanced Messaging Queuing Protocol (AMQP).

9. The system of claim 1, wherein the messaging protocol is Simple Text Oriented Messaging Protocol (STOMP).

10. A method of sending a message over a network, the method comprising:
generating, by one or more processors, a segment having a first header and a first payload, the first payload including an application payload to be sent over a messaging network to a target system, a first IP address being assigned to a virtual network interface that is linked to a logical network and included in the target system, and the first header specifying the first IP address as a first destination address for the segment;
generating a message by encapsulating, based on a messaging protocol, the segment;
determining a second destination address for the message, the message including a second header and a second payload, the second header specifying the second destination address including a text string concatenated with the first IP address, and the second payload including the segment;
generating a datagram having a third header and a third payload, the third header specifying a third destination address for the datagram, the third destination address being different from the first and second destination addresses, and the third payload including the message; and
sending, via a physical network interface, the datagram over the messaging network, the messaging network being based on the messaging protocol.

11. The method of claim 10, wherein the determining a second destination address includes concatenating the first IP address of the target system with the text string.

12. The method of claim 10, wherein a path of the message on the messaging network to the target system is based on the second destination address of the message.

13. The method of claim 10, wherein the messaging network is associated with one or more virtual networks, each virtual network having its own address space, the method further comprising:
identifying a virtual network interface associated with a virtual network of the one or more virtual networks; and
linking the virtual network interface to a horizontal grouping of associated computing devices, the horizontal grouping of associated computing devices being linked to the logical network, and the text string being an indication of the horizontal grouping of associated computing devices.

14. The method of claim 13, wherein the horizontal grouping of associated computing devices is a virtual local area network (VLAN), and the text string indicates the VLAN.

15. The method of claim 10, wherein the messaging protocol is Advanced Messaging Queuing Protocol (AMQP) or Simple Text Oriented Messaging Protocol (STOMP).

16. A non-transitory machine-readable medium comprising a plurality of machine-readable instructions that when executed by one or more processors is adapted to cause the one or more processors to perform a method comprising:
generating, by one or more processors, a segment having a first header and a first payload, the first payload including an application payload to be sent over a messaging network to a target system, an IP address being assigned to a virtual network interface that is linked to a logical network and included in the target system, and the first header specifying the IP address as a first destination address for the segment;
generating a message by encapsulating, based on a messaging protocol, the segment;

determining a second destination address for the message, the message including a second header and a second payload, the second header specifying the second destination address including a text string concatenated with the IP address, and the second payload including the segment;

generating a datagram having a third header and a third payload, the third header specifying a third destination address for the datagram, the third destination address being different from the first and second destination addresses, and the third payload including the message; and sending over the messaging network the datagram having the third destination address, the messaging network being based on the messaging protocol.

* * * * *